United States Patent [15] 3,689,808
Stampfli [45] Sept. 5, 1972

[54] CONTROL SYSTEM FOR AN ELECTROMAGNET

[72] Inventor: Harald Stampfli, Petit-Saconnex Geneva, Switzerland

[73] Assignee: Lucifer S.A., Geneva, Switzerland

[22] Filed: Oct. 1, 1970

[21] Appl. No.: 77,238

[30] Foreign Application Priority Data
Oct. 24, 1969 Switzerland.............15880/69

[52] U.S. Cl.............317/155, 317/141 S, 317/142 R, 317/148.5 B
[51] Int. Cl............................................H01h 47/32
[58] Field of Search...317/148.5, 142, 149, 155, 156, 317/157, 155.5, DIG. 6; 318/130

[56] References Cited

UNITED STATES PATENTS

| 3,514,191 | 5/1970 | Hoskin............317/148.5 R X |
| 3,403,302 | 9/1968 | Mason..................317/155 X |
| 3,384,790 | 5/1968 | Holec....................317/148.5 |
| 3,456,164 | 7/1969 | Sternberg...........317/155.5 X |
| 3,144,568 | 8/1964 | Silliman et al.........317/142 X |

Primary Examiner—J. D. Miller
Assistant Examiner—Harry E. Moose, Jr.
Attorney—Emory L. Groff and Emory L. Groff, Jr.

[57] ABSTRACT

A control system for an electromagnet provided with a power winding controlling the motion of the movable core and with a maintenance winding holding the core in its attracted condition. The power winding is first energized through a first thyristor (a silicon controlled rectifier, generally designated SCR) or transistor by a closing of a rough rectified A.C. circuit and, after a short delay, a condenser discharges through a component provided with a threshold for voltage conduction into an electrode controlling another thyristor or transistor or the like means which energizes then the maintenance winding and provides for the release or the first thyristor or transistor so as to deenergize the power winding. The maintenance winding remains then energized until the rectified circuit is switched off.

2 Claims, 2 Drawing Figures

INVENTOR

HARALD STAMPFLI

BY

ATTORNEY

CONTROL SYSTEM FOR AN ELECTROMAGNET

It is a well-known fact that in electromagnets, chiefly those provided with a plunger core it is necessary to resort to a comparatively large electric power so as to start the motion of the core while the gap is still large, whereas a much lower electric power is required for keeping the core in its attracted condition. In order to prevent excessive heating and for sake of economy in expenditure of current, it is therefore of advantage to reduce the intensity of the latter as soon as only maintenance of the core in its attracted position is required.

Obviously, it is possible to adjust the intensity of the current by resorting to different means with a view to limiting the intensity of the maintenance current to a value less then that of the electromagnet-driving current. However, when the voltage of the supply of energy is of an unvarying value, the reduction in intensity leads to the insertion in series of a resistance forming the seat of an undesired dissipation of electric energy. It is therefore of interest to produce electromagnets provided with two windings of which one forms a power winding and is fed at the start so as to ensure the first shifting of the magnetic core while the other winding or maintenance winding shows a much higher impedance and is energized so as to keep the core in its attracted position.

Furthermore, it is of advantage to allow control of the electromagnets through A.C. possibly after rectification since in practice A.C. is generally available whereas the use of a supply of filtered D.C. leads to a comparatively important increase in cost.

The present invention covers a control system for an electromagnet the cost price of which is low, the bulk of which is small, and the operation of which may be obtained in association with a single supply of A.C. Furthermore, said system may be connected with supplies of comparatively large voltages, say up to 380 volts, and it may serve for controlling powers reaching up to several kilowatts. Lastly it shows the advantage of allowing a speedy switching.

My invention relates to a system controlling an electromagnet provided with a power winding and with a maintenance winding, said system including switching means ensuring automatically the connection between a power supply and either of said windings selectively, said means being associated with a main switch. According to the invention, each winding is inserted in series with a semi-conductive element the conductivity of which is controlled by a control electrode while the two windings and cooperating semi-conductive elements are connected in parallel between two feed points the intensity at which is adjusted by the main switch. The semi-conductive element associated with the power winding is controlled by the section of the circuit including the maintenance winding so as to be rendered conductive or non-conductive according as to whether said circuit section is non-conductive or conductive, the semi-conductive element associated with the maintenance winding being controlled by a timer so as to become conductive as soon as a predetermined period of time has elapsed after the main switch has been closed.

The accompanying drawing illustrates diagrammatically and by way of example two embodiments of the control system according to the invention. In said drawing.

Figure 1:
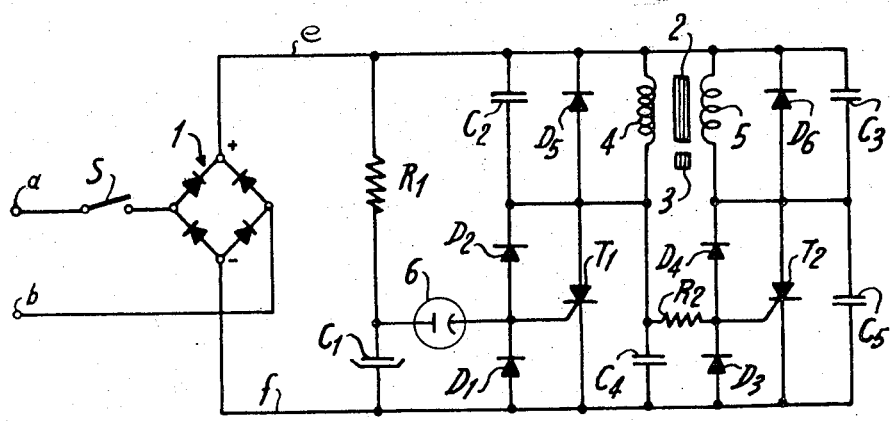
FIG. 1 is a wiring diagram of a first embodiment, wherein the semi-conductive elements are constituted by thyristors.

Turning to FIG. 1, the input terminals $a$ and $b$ are adapted to be connected with a supply of 220 volts for instance. Said terminals are connected through a main switch S with an annular rectifier 1. Said rectifier 1 is connected through its positive terminal with a line $e$ while its negative terminal is connected with a line $f$. Between said lines, there prevails a non-filtered rectified A.C. voltage.

The electromagnet includes a stationary magnetic core 3 adapted to be attracted by the core 2. Of course, the core 3 is guided but the guiding means have not been illustrated so as not to unnecessarily overload the drawing.

A magnetic field is produced in the core 2 by two windings 4 and 5, the winding 4 forming the maintenance winding and the winding 5 forming the power winding.

The maintenance winding 4 is inserted in series with the thyristor $T_1$ across the lines $e$ and $f$. Similarly, the power winding 5 is inserted in series with a thyristor $T_2$ across said lines. The control electrode or gate for the thyristor $T_1$ is connected through a tube 6 of the type discharging in a gasiform atmosphere, with a point connecting a condenser $C_1$ and a resistor $R_1$, which condenser and resistor are also inserted in series across the lines $e$ and $f$.

Two diodes $D_1$ and $D_2$ connect the gate of the thyristor $T_1$ respectively with the cathode and with the anode of said thyristor. The anode of the thyristor $T_1$ is connected through a resistor $R_2$ with the gate of the thyristor $T_2$. Said gate is also connected with the corresponding cathode and anode through the diodes $D_3$ and $D_4$ respectively.

Lastly, the maintenance winding 4 is shunted by a diode $D_5$ and a condenser $C_2$ in parallel, whereas the power winding 5 is shunted by a diode $D_6$ and a condenser $C_3$ in parallel.

Each of the thyristors $T_1$ and $T_2$ is shunted by a condenser $C_4$, respectively $C_5$.

The operation of the system is as follows:

As soon as the switch S is closed, the rectifier 1 supplies a rough rectified voltage across the lines $e$ and $f$. The thyristor $T_1$ is then in a non-conductive condition since its control electrode has not yet been raised to a positive voltage with reference to the line $f$. In contradistinction, the control electrode of the thyristor $T_2$ is connected through the resistor $R_2$ and the maintenance winding 4 with the line $e$. Said control electrode is thus fed with positive current and, consequently, the thyristor $T_2$ becomes immediately conductive upon closing of the main switch S. The power winding 5 is therefore immediately energized at this moment.

As a consequence of the voltage appearing across the lines $e$ and $f$, the condenser $C_1$ is loaded through the resistor $R_1$ and as soon as its voltage reaches the value producing the ignition of the gas-filled tube 6, the latter becomes conductive and provides for the flow of current towards the gate of the thyristor $T_1$ so as to energize the latter. The thyristor $T_1$, being now conductive, allows current to flow through the maintenance winding 4. Since the drop in voltage across the thyristor $T_1$ is negligible with reference to that between the lines $e$ and $f$, the end of the resistance $R_2$ connected with the winding 4 is brought to a voltage very little different from that of the line $f$, which voltage is not sufficient for rendering conductive the thyristor $T_2$. Thus, at the end of the alternation which has rendered the thyristor $T_1$ conductive, the thyristor $T_2$ becomes non-conductive during the passage of the rectified current through zero and it remains thenafter in its nonconductive condition.

The thyristor $T_1$ remains conductive as long as the main switch S is closed. When said switch is re-opened, the feed current is cut off and the maintenance winding 4 is no longer energized.

The diodes $D_1$, $D_3$, $D_5$ and $D_6$, and the condensers $C_2$ to $C_5$ are provided solely with a view to preventing over-voltages which might damage the thyristors $T_1$ and $T_2$. The part played by the diodes $D_2$ and $D_4$ consists in allowing a negative return current to pass through the control electrodes respectively of the thyristor $T_1$ and of the thyristor $T_2$ in order to extinguish same. This occurs each time the voltage across the lines $e$ and $f$ passes through zero between two alternations and when said voltage is cut out by the opening of the switch S.

The condensers $C_2$ and $C_4$ on the one hand, and $C_3$ and $C_5$ on the other hand serve for limiting the value of dV/dt at the moment of switching off the current of the corresponding windings 4 and 5, whereby an undesired reignition of the thyristors $T_1$ and $T_2$ is prevented and said thyristors are reliably blocked at such moments.

Figure 2:
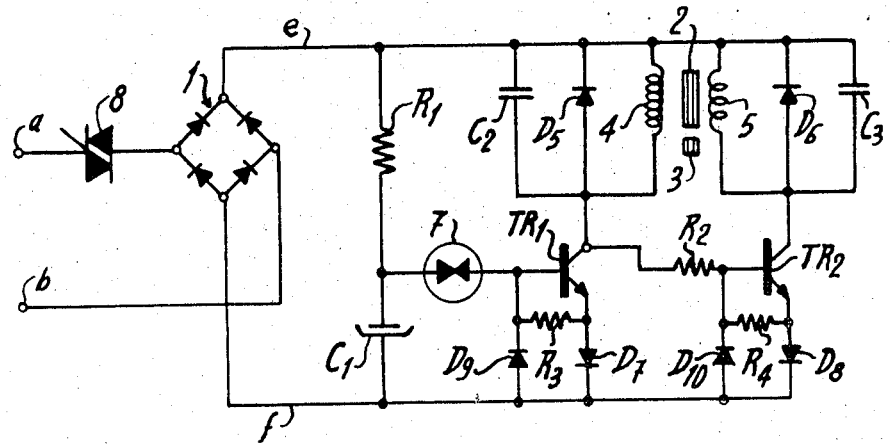
FIG. 2 is a wiring diagram similar to FIG. 1, wherein transistors are substituted for thyristors.

The wiring diagram of FIG. 2 is similar to that of FIG. 1 except for the fact that the thyristors are replaced by transistors. The circuit according to FIG. 2 is thus intended for the control of the energization of the windings of electromagnets of a reduced power. Said circuit includes as precedingly the terminals $a$ and $b$, the rectifier 1, the resistor $R_1$ and the condenser $C_1$ together with the feed lines $e$ and $f$. However, the main switch S of FIG. 1 is replaced by a triac 8, so that all the components of the circuit are static ones. The windings 4 and 5 are similar to those of the preceding case as also the corresponding diodes $D_5$ and $D_6$ and condensers $C_2$ and $C_3$.

The winding 4 is controlled by a transistor $TR_1$ the base of which is connected with a point connecting the condenser $C_1$, with the resistor $R_1$, the base of said transistor being connected with said point through the agency of a diac 7, which latter semi-conductive element acts as a Zener diode, but shows a conductive threshold which is the same for both polarities of the voltage applied thereto.

The winding 5 is controlled by a transistor $TR_2$ the base of which is controlled by the resistor $R_2$ in the manner disclosed for the thyristor $T_2$ of the first embodiment.

The emitters of the transistors $TR_1$ and $TR_2$ are connected each with the line $f$ through the corresponding diode $D_7$ or $D_8$ acting as a biasing resistance. The base of each transistor is connected with its emitter through a corresponding resistor $R_3$ or $R_4$. The diodes $D_9$ and $D_{10}$ cooperate in the protection of the bases $TR_1$ and $TR_2$.

The operation of this second embodiment is practically the same as that of the first embodiment except for the fact that the return of the transistor $TR_2$ to its non-conductive condition is obtained immediately as soon as the transistor $TR_1$ has become conductive.

Obviously the delay provided for the energization of the winding 4 may be obtained by a timer or delaying means different from the means illustrated and which include the association of the resistance $R_1$ and of the condenser $C_1$ with the semi-conductive element 6 or 7 provided with a threshold for voltage conduction.

I claim:

1. In combination with an electromagnet including a power winding and a core-maintaining winding, the provision of a control circuit comprising first and second feed lines, a main switching means in one of said lines, said power winding and said core-maintaining winding being connected each by one of their extremities to said first feed line, each winding being inserted in series with a semi-conductive element the conductivity of which is controlled by a control electrode with the two windings and cooperating semi-conductive elements being connected in parallel between said first and second feed lines, means including a resistor in series with the core-maintaining winding and directly connected to the other extremity of said core-maintaining winding at one end and to the control electrode for the power winding at the other end, said means controlling the conductivity of the semi-conductive element inserted in series with the power winding, and controlled by the energization of the core-maintaining winding so as to be de-energized when the latter is energized and conversely, and delaying means inserted across the two lines and adapted to control the conductivity of the semi-conductive element inserted in series with the core-maintaining winding to energize the latter at a predetermined moment following the closing of the main switching means, whereby the power winding is first energized with the relatively high power necessary to move the magnet core to an operative position, and after a time delay the core-maintaining winding is energized, causing de-energization of the power winding so that the magnet core is maintained in operative position by the relatively low power required by the core-maintaining winding.

2. A control circuit as claimed in claim 1, comprising a supply of A.C. and means rectifying the current from said supply to feed a rough rectified current through said feed lines, and wherein said semi-conductive elements are silicon controlled rectifiers.

* * * * *